United States Patent [19]
Klobe

[11] 4,285,247
[45] Aug. 25, 1981

[54] FLOW MEASURING DEVICE

[75] Inventor: Martin Klobe, Karlsruhe, Fed. Rep. of Germany

[73] Assignee: Siemens Aktiengesellschaft, Berlin and Munich, Fed. Rep. of Germany

[21] Appl. No.: 58,768

[22] Filed: Jul. 19, 1979

[30] Foreign Application Priority Data

Jul. 21, 1978 [DE] Fed. Rep. of Germany ....... 2832142

[51] Int. Cl.³ .............................................. G01F 1/32
[52] U.S. Cl. .................................................. 73/861.24
[58] Field of Search .......... 73/194 VS, 861.22–861.24

[56] References Cited

U.S. PATENT DOCUMENTS 3,972,232 8/1976 Miller ................................. 73/861.22
4,052,895 10/1977 Herzl et al. ........................ 73/861.22

Primary Examiner—Herbert Goldstein
Attorney, Agent, or Firm—Kenyon & Kenyon

[57] ABSTRACT

The present invention is directed to a flow measuring device according to the principle of the Karman vortex path, with a vortex-generating choke body which is adapted to be positioned within a pipe section and which comprises a prismatic forward part of trapezoidal cross-section which is positioned in said pipe section with its larger forward parallel surface against the flow direction, and a slab-shaped extension which follows the prismatic part's rearward parallel surface and which extends in the flow direction, and which also includes pressure pickups positioned inside said prismatic part of the choke body, such that said pickups can measure the periodic pressure variations which are generated by the vortex separation.

14 Claims, 3 Drawing Figures $\frac{h}{a} = 0{,}5 \cdots 1$ $\frac{l}{a} = 0{,}5 \cdots 1$ $\frac{h+l}{a} = 1{,}2 \cdots 1{,}7$ $\frac{b}{a} = 0{,}5 \cdots 0{,}7$ $\frac{d}{a} = 0{,}15 \cdots 0{,}35$

FLOW MEASURING DEVICE

BACKGROUND OF THE INVENTION

1. Field of the Invention

This invention relates to a flow measuring device according to the principle of the Karman vortex path.

2. Description of the Prior Art

Devices for measuring flow are known. For example, U.S. Pat. No. 3,972,232 describes and claims such a device in which the choke body is constructed of a T-shaped structure having a relatively narrow prismatic forward part of trapezoidal cross-section and a following slab-shaped part of relatively large thickness. The means for measuring the pressure variations are arranged in the form of piezoelectric pickups in the slab-shaped part in such a manner that the pressure-sensitive surfaces are attached to the upper and lower side surfaces of the slab-shaped part and are parallel to the flow.

It has been found that, depending on the type of measuring medium and the flow velocity, the slap-shaped extension and with it, the outside surfaces of the pressure pickup arranged in the known measuring device are subject to the eroding influences, to dirt and deposits or a combination of these. The results are erroneous measurements.

It is therefore an object of this invention to provide a flow measuring device which provides accurate measurements.

It is also an object of this invention to provide a flow measuring device according to the principle of the Karman vortex path in which the structural configuration of the choke body is favorable for vortex separation and in which the surfaces containing or actuating the pressure pickups are positioned in a zone which is as undisturbed as possible.

Still other objects and advantages of the present invention will be obvious and apparent to those of skill in the art from the specification and the appended claims.

SUMMARY OF THE INVENTION

These and other objects which are apparent to those of skill in the art from a consideration of the specification and appended claims are achieved by the flow measuring device of the present invention.

This invention provides a flow measuring device according to the principle of the Karman vortex path which comprises:

a vortex generating choke body having a prismatic part of trapezoidal cross-section having a height of h and in which a first side of the trapezoidal cross-section has a length of a and in which a second side of the trapezoidal cross-section has a length of b, and said second side and said first side are parallel alignment; and having a slab-like extension of a length l and of a maximum width d projecting away from said second side; and said choke body having pressure pickups positioned in said prismatic part of the choke body for measuring the periodic pressure variations which are generated by the vortex separation, wherein:

b is less than a;

the ratio of the height h of said prismatic portion to the length a of the first side is a value of from about 0.5 to about 1;

the ratio of the length of the first side a to the length l of said slab-like extension projecting away from said second side is a value of from about 0.5 to about 1;

the ratio of the sum of the height h of said trapezoidal cross-section and the length l of said slab-shaped extension to the length of said first side is a value of from about 1.2 to about 1.7;

the ratio of the length of said second side to the length of said first surface is a value of from about 0.5 to about 0.7; and the ratio of the width of said slab-shaped extension to the length of said first side is a value of from about 0.15 to about 0.35.

The aforementioned dimensions of the measuring device of this invention provides for especially advantageous vortex separation effects together with the advantages of greater freedom of choice in the attachment of the pressure pickups in the prismatic part of the choke body. These advantageous results are achieved by positioning the flow measuring device of this invention within a pipe section, such that the prismatic part of trapezoidal cross-section is arranged with its larger first side against the flow direction, and such that the slab-shaped extension projecting away from the smaller second side of said prismatic part extends rearward in the direction of flow.

BRIEF DESCRIPTION OF THE DRAWINGS

The preferred embodiments of this invention, and the preferred uses thereof, will be described in greater detail in conjunction with the accompanying drawings. It should be appreciated that the means of carrying out the preferred embodiments exemplified in the drawings are not limiting, but rather are illustrative and representative of many other embodiments which are within the spirit of this invention.

DESCRIPTION OF THE PREFERRED EMBODIMENTS

Figure 1:
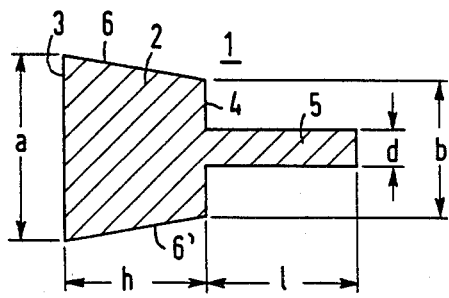
FIG. 1 is a vertical cross-sectional view of an embodiment of this invention, which illustrates the basic structural configuration of the device of this invention.

In FIG. 1 the form of the cross-section of a choke body 1 is shown. It consists of a forward prismatic part 2 of trapezoidal cross-section which is adapted to be positioned with its larger parallel surface 3 having the side length a against the flow direction and having a smaller parallel surface 4 with a side length b. The surfaces 3 and 4 are joined in parallel alignment by side surfaces 6 and 6'. The choke body 1 also includes an extension 5 with the side length l and thickness d, which follows the choke body's rearward parallel surface 4 with the side length b and extends essentially perpendicular to the plane of parallel surfaces 3 and 4 and in the flow direction.

In the embodiment of FIG. 1, the geometrical dimension of the choke body 1 confirm to the following relationships:

| | | |
|---|---|---|
| h/a | = | 0.5 to 1 |
| l/a | = | 0.5 to 1 |
| (h + l)/a | = | 1.2 to 1.7 |

-continued

| | | |
|---|---|---|
| a/b | = | 0.5 to 0.7 |
| d/a | = | 0.15 to 0.35 | wherein a is the longer parallel side of the trapezoidal cross-section;

b is the shorter parallel side of the trapezoidal cross-section;

h is the height of the trapezoidal cross-section;

l is the length of the sides of the slab-like extension; and d is the thickness of the slab-like extension.

These dimensional relationships are responsible for the advantageous operating characteristics of the device of this invention.

Figure 2:
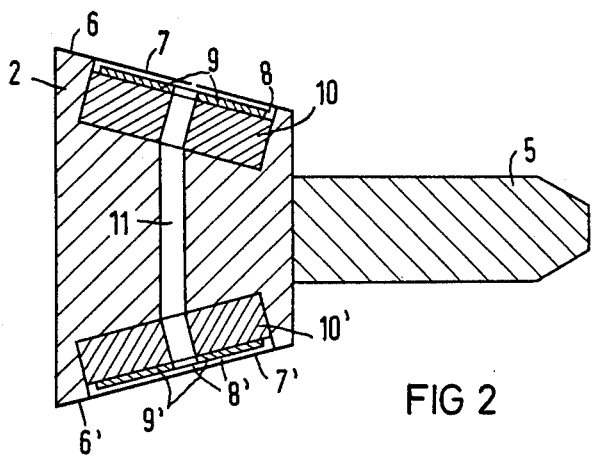
FIG. 2 is a vertical cross-sectional view of another embodiment of this invention which depicts pressure pickup in the prismatic part of the choke body.

As is more readily apparent from a consideration of FIG. 2, the prismatic part 2 of the trapezoidal cross-section includes shallow chambers 8 and 8' positioned in the side surfaces 6 and 6'. Covering and sealing each of chambers 8 and 8' is a deflectable structure which forms a sealing wall which can be defected under pressure. In the embodiment of FIG. 2 the deflectable structure are deflectable diaphragms 7 and 7', which cover chambers 8 and 8', respectively.

In these chambers 8 and 8' or in communication therewith are transducers for measuring pressure changes. In the embodiment of FIG. 2, the transducers convert the deflections of diaphragms 7 and 7' caused by the periodic pressure variations, and deliver signals which are proportional to the amplitude and frequency of these pressure variations. In the present invention, distance or distance-change measuring pickups of known types can be used as transducers. These known types usually operate according to either capacitive, inductive, resistive or piezoelectric method. For example, in FIG. 2, capacitive measuring pickups, are shown. The diaphragms 7 and 7' consist at least on their inside surfaces facing chambers 8 and 8' of metal and each constitutes the movable electrode of a capacitor. The fixed electrodes 9 and 9' of the capacitor are attached in the chambers 8 and 8' on insulating inserts 10 and 10'. These chambers 8 and 8' are filled with an incompressible liquid and are connected via the canal 11 in a pressure-conducting manner, so that the capacitive pickups can be operated in a differential circuit.

Figure 3:
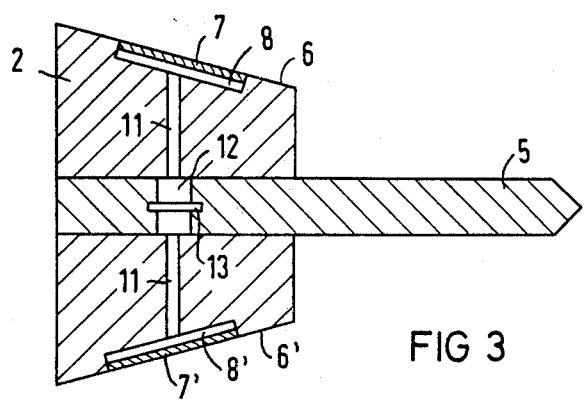
FIG. 3 is a vertical cross-sectional view of another embodiment of this invention in which the choke body is constructed of several parts, and which illustrate pressure pickups in the prismatic part of the choke body.

FIG. 3 shows an embodiment of a choke body constructed from several parts. In this embodiment, the flat chambers 8 and 8' are covered by the diaphragms 7 and 7' in the sides surfaces 6 and 6' and are filled with an incompressible liquid. Canal 11 connects the chambers 8 and 8' in a pressure-conducting manner to a measuring chamber 12 which is arranged approximately in the center plane of the prismatic part 2. Chamber 12 is subdivided by a partition 13 into two halves. The partition 13 may be a doped semiconductor diaphragm with piezoresistive properties, or a pressure sensitive semiconductor material with piezoelectric properties. The pressure pulses which are generated by vortex separation at the lateral surfaces 6 and 6' and which act on the diaphragms 7 and 7' alternatingly by hydraulic means, are transmitted to partition 13 where the pressure variations can be measured.

In another embodiment not depicted here, the liquid filled chambers 8 and 8' which are sealed off the diaphragms 7 and 7', can be connected via pressure lines to pressure transducers located outside the choke body in a conventional manner.

This invention has been described in terms of the specific embodiments set forth in detail. Alternative modifications and embodiments will be apparent to those of skill in the flow measuring device art from a consideration of the generic description of the invention, and the specific embodiments described in this disclosure. Such modifications and embodiments are within the spirit of the invention as disclosed and as claimed in the appended claims.

What is claimed is:

1. A flow measuring device according to the principle of the Karman vortex path which comprises:

a vortex generating choke body having a prismatic part of trapezoidal cross-section of a height h, said prismatic part of trapezoidal cross-section having a first side of a length a and a section side of a length b in parallel alignment with said first side, and said choke body having a slab-like extension of a length l and a maximum width d projecting away from said second side; and pressure pickups positioned inside said prismatic part of the choke body, such that said pressure pickups can measure the periodic pressure variations which are generated by the vortex separation, said pressure pickups comprising at least two chambers positioned in the side walls of said prismatic part of trapezoidal cross-section, each of said chambers is covered by an element constructed of a pressure deflectable material, and each of said chambers is connected in a pressure conducting manner with transducers for converting the deflections of said deflectable element into electrical signals which are proportional to said deflections;

wherein:

b is less than a;

the ratio of the height h of said trapezoidal cross-section to the length a of the first side is a value of from about 0.5 to about 1;

The ratio of the length l of said slab like extention projecting away from said second side b to the length of the first surface a is a value of from about 0.5 to about 1;

the ratio of the sum of the height h of said trapezoidal cross-section and the length l of said slab-like extention to the length of the first side a is a value of from about 1.2 to about 1.8;

the ratio of the length of said second side b to the length of said first side a is a value of from about 0.5 to about 0.7; and the ratio of the width d of said slab-like extension to the length a of said first side is a value of from about 0.15 to about 0.35.

2. A flow measuring device according to claim 1 wherein said pressure deflectable element is a diaphragm.

3. A flow measuring device according to claim 1 wherein each of said chambers is filled with an incomprehensible liquid and said chambers are connected to each other in a pressure conducting manner.

4. A flow measuring device according to claim 2 wherein each of said chambers is filled with an incompressible liquid and said chambers are connected to each other in a pressure-conducting manner.

5. A flow measuring device according to claim 2, 4 or 3 wherein said pressure pickups are capacitive distance pickups.

6. A flow measuring device according to claim 2, 4 or 3 wherein said pressure pickups are inductive distance pickups.

7. A flow measuring device according to claim 5 wherein said pressure pickup includes a fixed electrode one of which is positioned in each of said chambers, and a movable electrode positioned to in substantially parallel alignment with each of said fixed electrodes, and which is adapted to be moved into engagement with said fixed electrode by deflections of said diaphragms.

8. A flow measuring device according to claim 7 wherein at least the inside surface of each of said diaphragms consists of a metal, said metal surface forming said movable electrode.

9. A flow measuring device according to claim 2, 4 or 3 wherein each of said chambers is filled with an incompressible liquid and is connected via pressure lines to pressure transducers located outside of said choke body.

10. A flow measuring device according to claim 2, 4 or 3 having two chambers.

11. A flow measuring device according to claim 10 wherein each of said chambers is filled with an incompressible liquid, and said choke body includes a measuring chamber positioned inside of said prismatic part, said measuring chamber being divided into halves by a pressure sensitive partition, and one of each halves is connected to one of each of said chambers in a pressure conducting manner.

12. A flow measuring device according to claim 11 wherein said measuring chamber is positioned in said prismatic part symmetrically to the central plane of said prismatic part.

13. A flow measuring device according to claim 5 wherein said pressure pickup includes a fixed electrode one of which is positioned in each of said chambers, and a movable electrode positioned to in substantially parallel alignment with each of said fixed electrodes, and which is adapted to be moved into engagement with said fixed electrode by deflections of said diaphragms.

14. A flow measuring device according to claim 13 wherein at least the inside surface of each of said diaphragms consists of a metal, said metal surface forming said movable electrode.

* * * * *